(12) United States Patent
Chen et al.

(10) Patent No.: US 8,698,797 B2
(45) Date of Patent: Apr. 15, 2014

(54) METHOD AND DEVICE FOR GENERATING MULTI-VIEWS THREE-DIMENSIONAL (3D) STEREOSCOPIC IMAGE

(75) Inventors: Hsin Jung Chen, Yilan County (TW); Feng Hsiang Lo, Hsinchu County (TW); Sheng Dong Wu, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 729 days.

(21) Appl. No.: 12/950,480

(22) Filed: Nov. 19, 2010

(65) Prior Publication Data

US 2011/0157159 A1 Jun. 30, 2011

Related U.S. Application Data

(60) Provisional application No. 61/290,810, filed on Dec. 29, 2009.

(51) Int. Cl.
*G06T 15/00* (2011.01)
*G06T 15/40* (2011.01)
*G06K 9/00* (2006.01)
*H04N 13/00* (2006.01)
*H04N 9/47* (2006.01)

(52) U.S. Cl.
USPC ........... 345/419; 345/421; 345/422; 382/154; 348/42; 348/51

(58) Field of Classification Search
USPC ................ 345/419, 418, 421, 422, 619–621, 345/623–624, 501, 519, 545–548; 348/42–44, 46–48, 51, 54; 382/154, 382/285
See application file for complete search history.

(56) References Cited

U.S. PATENT DOCUMENTS

| 7,126,598 B2* | 10/2006 | Oh et al. ........................ 345/419 |
| 2010/0158351 A1* | 6/2010 | De Jong et al. ................ 382/154 |
| 2010/0195716 A1* | 8/2010 | Klein Gunnewiek et al. ........................ 375/240.08 |

FOREIGN PATENT DOCUMENTS

| EP | 0454129 B1 | 12/1998 |
| EP | 0878099 B1 | 7/2001 |
| WO | 2006137000 A1 | 12/2006 |
| WO | 2009001255 A1 | 12/2008 |

OTHER PUBLICATIONS

Intellectual Property Office, Ministry of Economic Affairs, R.O.C., "Office Action", Dec. 2, 2013, Taiwan.

* cited by examiner

*Primary Examiner* — Wesner Sajous
*Assistant Examiner* — Jed-Justin Imperial
(74) *Attorney, Agent, or Firm* — Morris Manning & Martin LLP; Tim Tingkang Xia, Esq.

(57) ABSTRACT

A method and a device for generating a multi-views three-dimensional (3D) stereoscopic image are based on displaying positions of target image elements of each view image of a multi-views 3D stereoscopic image in a 3D stereo display. Source image elements suitable to be displayed at each displaying position are obtained from a 2D-depth mixed image formed by combining a source 2D image and a corresponding depth map through an inverse view image searching manner, thereby generating a multi-views 3D stereoscopic image from the set target image elements for being displayed in the 3D stereo display.

16 Claims, 15 Drawing Sheets

| | | | | | | | | | | |
|---|---|---|---|---|---|---|---|---|---|---|
| Source pixel in the first row of the source 2D image. | Source pixel in the first row of the source 2D image. | Source pixel in the first row of the source 2D image. | Source pixel in the second row of the source 2D image. | Source pixel in the second row of the source 2D image. | . . . . | Source pixel in the last row of the source 2D image. | Source pixel in the last row of the source 2D image. | Source pixel in the last row of the source 2D image. | Depth value in the first row of the depth map. | Depth value in the first row of the depth map. | Depth value in the first row of the depth map. | Depth value in the second row of the depth map. | Depth value in the second row of the depth map. | . . . | Depth value in the last row of the depth map. | Depth value in the last row of the depth map. | Depth value in the last row of the depth map. |

2D-depth mixed image horizontal direction → vertical direction ↓

FIG.5

METHOD AND DEVICE FOR GENERATING MULTI-VIEWS THREE-DIMENSIONAL (3D) STEREOSCOPIC IMAGE

CROSS-REFERENCE TO RELATED APPLICATIONS

This non-provisional application claims priority under 35 U.S.C. §119(e) on Patent Application No. 61/290,810 filed in the United States on Dec. 29, 2009, the entire contents of which are hereby incorporated by reference.

TECHNICAL FIELD

The present disclosure relates to a method and a device for generating a three-dimensional (3D) image, and more particularly to a method and a device for generating a multi-views 3D stereoscopic image by using a two-dimensional (2D) image and a corresponding depth map, which are applicable to a 3D stereo display.

BACKGROUND

The visual principle of a 3D stereoscopic image is based on the fact that the left eye and the right eye of a human being respectively receive images of different views, and then a stereoscopic image with a depth and a distance sense is presented in the human brain by using binocular parallax through the brain. The 3D stereoscopic image displaying technique is developed based on such a principle.

The conventional methods for generating a 3D stereoscopic image may be approximately divided into two types. In the first method, a plurality of cameras disposed at different positions is used to simulate the circumstance that the eyes of a human being capture images of the same object from different view angles. Each camera captures a view image corresponding to a specific view angle. The two view images are synthesized a 3D stereoscopic image. Then a device, for example, polarized glasses, is used to guide the two view images to the left eye and the right eye of the human being respectively. The 3D stereoscopic image with a depth and a distance sense is generated in the human brain. In the other method, a 2D image and a depth map are used to synthesize a 3D stereoscopic image. The depth map records depth information of each pixel in the 2D image. The synthesized 3D stereoscopic image is displayed by a 3D stereo display. Accordingly, a 3D stereoscopic image with a depth and a distance sense is presented in the human brain when the image is observed by an observer with naked eyes. In the other aspect, a multi-views 3D stereoscopic image can be displayed according to arrangement positions of the pixels of a 3D stereoscopic image in a 3D stereo display by using a special hardware design of the 3D stereo display.

In the process of synthesizing a multi-views 3D stereoscopic image by using a 2D image and a depth map, the problems about image processing speed and usage of memory capacity must be considered. Taking a 3D stereoscopic image with 9 views as an example, the processing sequence in an existing method is as shown in FIG. 1. In a first step, a source 2D image 10 and depth information in a depth map 11 are used to generate nine view images 21-29 through operation, and then the nine view images 21-29 are used to synthesize a 3D stereoscopic image 30 with nine views. During the synthesizing process, a large memory capacity is required to store nine view images 21-29, and in the other aspect, since a large number of view images 21-29 perform accessing in the memory, the data processing speed is slowed down. For example, after the view images 21-29 are obtained by using the source 2D image 10 and the depth map 11 through operation, firstly, the generated view images 21-29 are written into the memory, and then during the synthesizing process of the multi-views 3D stereoscopic image 30, the view images 21-29 previously stored in the memory need to be used, so that the view images 21-29 are further read from the memory. As a result, the frequent memory reading and writing actions cause the processing speed to be slowed down.

Taking the prior art shown in FIG. 1 as an example, it is assumed that a 2D image at an input end has a resolution of 640×360 pixels, a 3D stereoscopic image 30 at an output end has a resolution of 1920×1080 pixels, and during the synthesizing process, nine different view images are generated, each of which has a resolution of 640×360 pixels. Accordingly, it can be derived that each view image requires a memory capacity of 640×360×24 bits=5,529,600 bits, and thus the total memory capacity required by the nine view images 21-29 is 9×5,529,600 bits, which is about 50 M bits, and if the memory capacity required by the images at the input end and the output end, that is, 2×(55,296,000+49,766,400), is further added, it is totally about 210 M bits. Thus, a large memory capacity is required for storing image information.

SUMMARY

Accordingly, the present disclosure is related to a method for generating a multi-views 3D stereoscopic image. Based on displaying positions of target image elements in each view image of a multi-views 3D stereoscopic image in a 3D stereo display, source image elements suitable to be displayed at each displaying position are obtained from a 2D-depth mixed image formed by combining a source 2D image and a corresponding depth map through an inverse view image searching manner, thereby generating a multi-views 3D stereoscopic image for being displayed in the 3D stereo display.

In an embodiment, the present disclosure provides a method for generating a multi-views 3D stereoscopic image, in which a multi-views 3D stereoscopic image is generated by using a source 2D image and a corresponding depth map, and the method comprises the following steps:

Obtaining displaying positions of target image elements of each view image of a multi-views 3D stereoscopic image in a 3D stereo display.

Searching source positions of source image elements suitable to be displayed at the displaying positions from the source 2D image and the depth map based on the displaying positions of the target image elements of each view image in the 3D stereo display.

Setting target image elements at the displaying positions as source image elements at the source positions, thereby generating the multi-views 3D stereoscopic image.

In another aspect, the present disclosure provides a device for generating a multi-views 3D stereoscopic image, which is applicable of generating a multi-views 3D stereoscopic image for being displayed in a 3D stereo display. In an embodiment, the device of the present disclosure further comprises a mixed image obtaining unit, a source position searching unit, and a storage unit.

The mixed image obtaining unit is used for obtaining a 2D-depth mixed image formed by combining a source 2D image and a corresponding depth map.

Based on displaying positions of target image elements of each view image in a 3D stereo display, the source position searching unit is used for searching source positions of source image elements suitable to be displayed at the displaying positions from the 2D-depth mixed image, and setting the target image elements at the display positions as source image elements at the source positions.

The storage unit is used for storing information of target image elements in each view image of the multi-views 3D stereoscopic image, so as to generate a multi-views 3D stereoscopic image for being displayed in a 3D stereo display.

BRIEF DESCRIPTION OF THE DRAWINGS

The present disclosure will become more fully understood from the detailed description given herein below for illustration only, and thus are not limitative of the present disclosure, and wherein:

FIG. 5 shows an embodiment of an arrangement manner of a 2D-depth mixed image according to the present disclosure;

DETAILED DESCRIPTION

Figure 1:
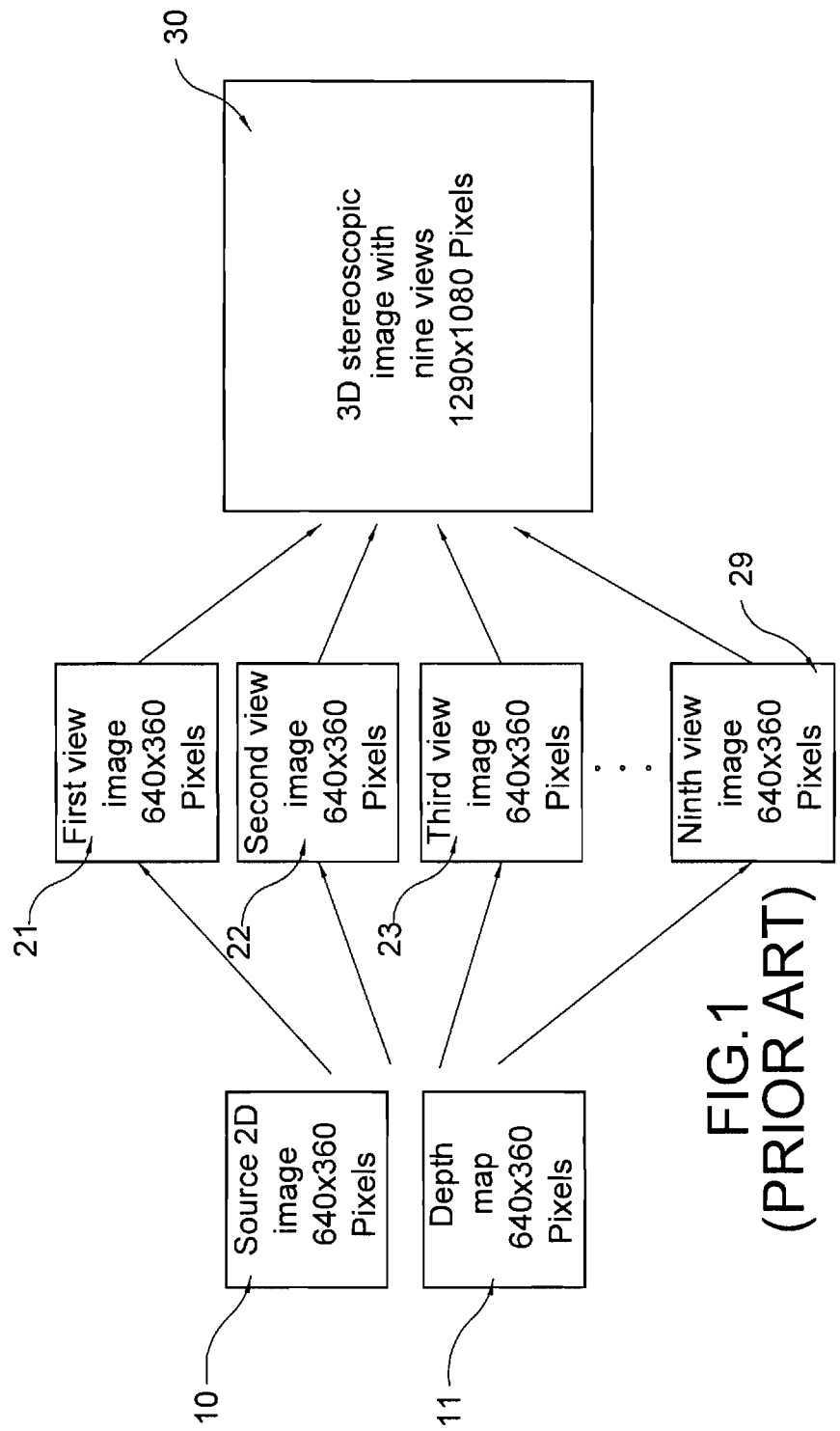
FIG. 1 shows a method for generating a multi-views 3D stereoscopic image in the conventional method.
Figure 2:
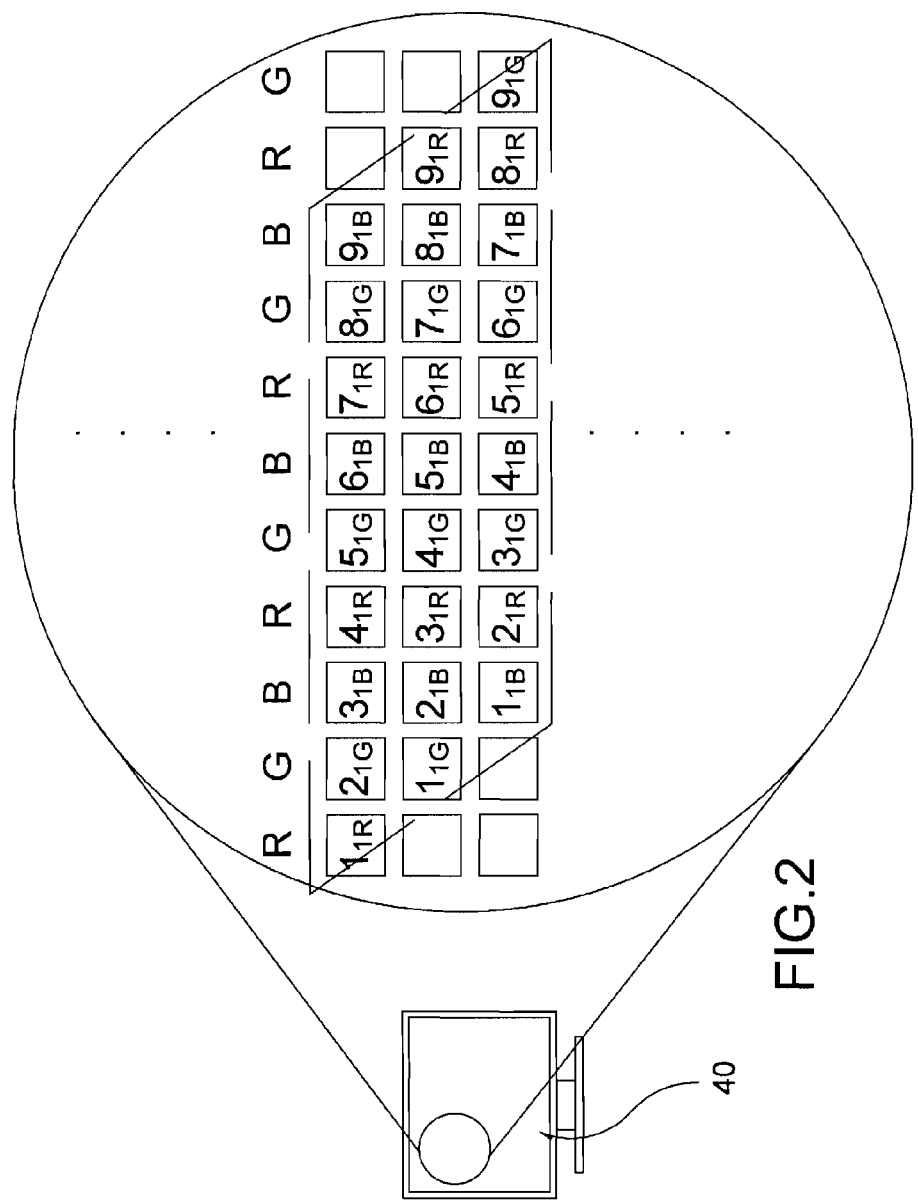
FIG. 2 shows an example of an existing 3D stereo display, in which displaying positions of pixels of each view image of a multi-views 3D stereoscopic image in the 3D stereo display are shown.

Currently, various types of 3D stereo displays (3D displays) available in the market support multi-views 3D stereoscopic images. However, due to the structural differences and number of supported views, the displaying positions of pixels of each view image of a multi-views 3D stereoscopic image in the 3D displays are different. The example shown in FIG. 2 is a 3D display 40 supporting 9 views, in which the displaying positions of pixels of the nine view images in the 3D display are represented by the symbols in FIG. 2. Specifically, $1_{1R}$ represents a displaying position for red sub-pixel (R) of a first pixel of a first view image, $1_{1G}$ represents a displaying position for green sub-pixel (G) of the first pixel of the first view image, $1_{1B}$ represents a displaying position for blue sub-pixel (B) of the first pixel of the first view image, and $2_{1R}$ represents a displaying position for red sub-pixel (R) of a first pixel of a second view image, and so forth. In other words, each pixel is formed of three sub-pixels. For example, the first pixel of the first view image is formed of three sub-pixels thereof, namely, the red sub-pixel $1_{1R}$, the green sub-pixel $1_{1G}$, and the blue sub-pixel $1_{1B}$.

According to an embodiment of the present disclosure, an image element may be a pixel or a sub-pixel. In addition, for distinguishment, the target image element refers to the image element in the 3D display 40, the source image element refers to the image element in a source 2D image, and detailed technical features thereof are illustrated herein below.

Figure 3:
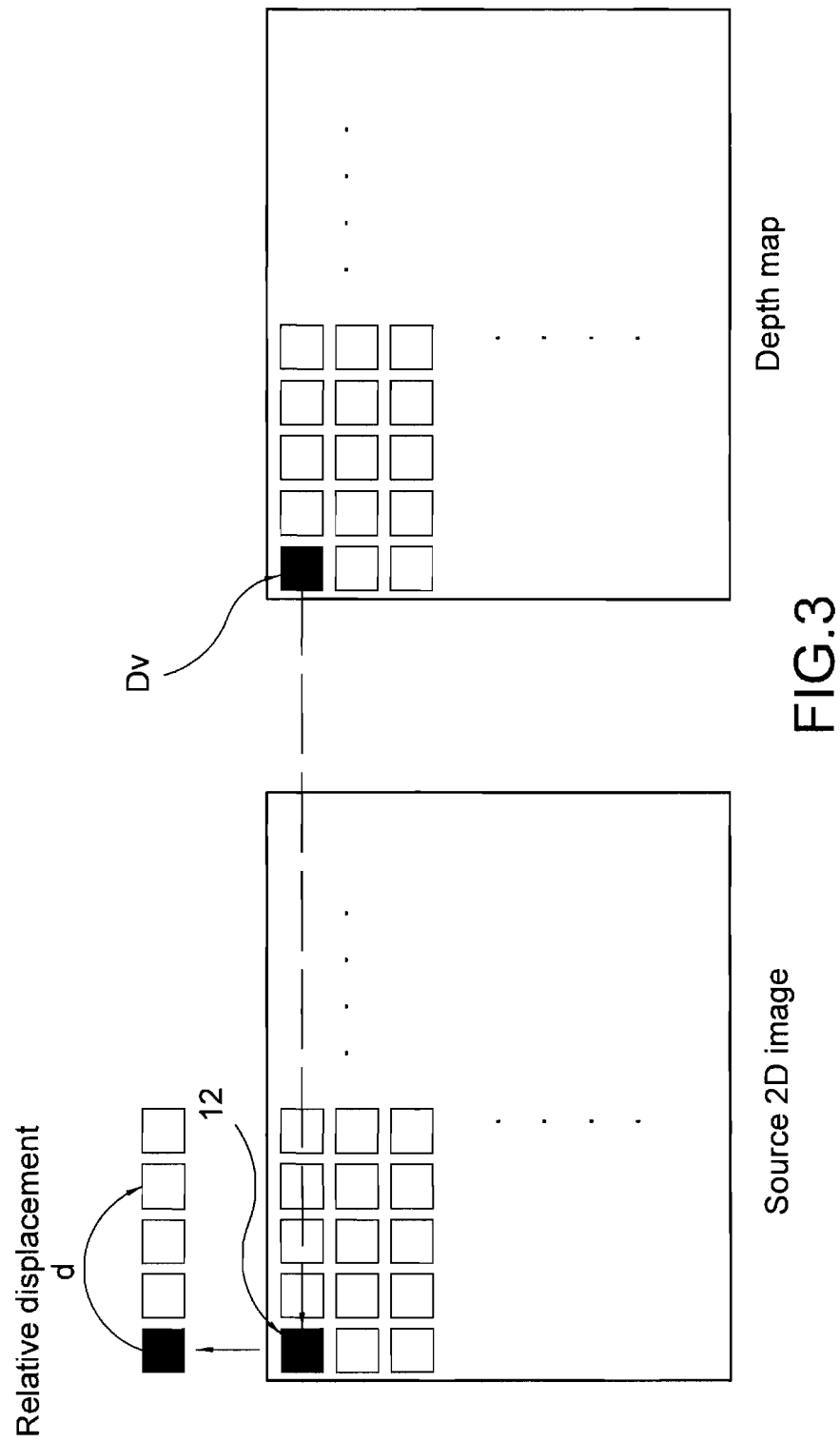
FIG. 3 shows a relation between a source 2D image and a corresponding depth map according to an embodiment of the present disclosure.

The method according to an embodiment of the present disclosure uses a source 2D image and a corresponding depth map to generate a multi-views 3D stereoscopic image, and displays target image elements of each view image of the multi-views 3D stereoscopic image in a 3D stereo display 40 according to decided displaying positions in the 3D display 40. As shown in FIG. 3, the source 2D image comprises a plurality of source pixels 12 arranged in an array, in an embodiment, each source pixel 12 is formed of three color (Red, Green, and Blue) sub-pixels, and depth values (Dv) of the source pixels 12 are recorded in the depth map. In order to facilitate the understanding and discrimination, the "source pixel 12" is used to refer to each pixel of the source 2D image in the following description. The depth value Dv may determine its division depth according to practical requirements, and it is assumed that 8 bits is taken as the division depth, the depth value Dv may be represented as any value between 0-255; and similarly, other division depths, such as 10 bits, 12 bits, or higher, may also be used to record the depth value Dv of the source pixel 12.

The method according to an embodiment of the present disclosure generates a multi-views 3D stereoscopic image for being displayed in a 3D display 40 by using a source 2D image and a corresponding depth map. Referring to an embodiment shown in FIG. 4, the method includes the following steps:

1. Obtaining displaying positions of target image elements of each view image of a multi-views 3D stereoscopic image in a 3D stereo display 40;

2A. Searching source positions of source image elements to be displayed at the displaying positions from the source 2D image and the depth map based on the displaying positions of the target image elements of each view image in the 3D stereo display 40; and 3. Setting target image elements at the displaying positions as the source image elements at the source positions.

In another embodiment of the method according to the present disclosure includes a step of combining the source 2D image and the depth map into a 2D-depth mixed image.

A principle for generating the 2D-depth mixed image is rearranging the source 2D image and the corresponding depth map to generate a 2D-depth mixed image with a resolution as much the same as that of the multi-views 3D stereoscopic image. Based on this principle, the 2D-depth mixed image has various arrangement manners. In one arrange manner, the source 2D image and the depth map are rearranged into a 2D-depth mixed image by using an nX interlacing arrangement manner, and a resolution of the 2D-depth mixed image is the same as that of the multi-views 3D stereoscopic image finally displayed on the 3D display 40, in which n is an integer. From another viewpoint, the 2D-depth mixed image executes input data of a method according to an embodiment of the present disclosure, and the multi-views 3D stereoscopic image is output data of the method according to the embodiment of the present disclosure. FIG. 5 shows one embodiment of the arrangement manners of the 2D-depth mixed image, which can be divided into a left part and a right part. The left part of the 2D-depth mixed image table corresponds to sources pixels 12 of the source 2D image, and a right part thereof corresponds to Dvs in the depth map, respectively. More specifically, the first row of source pixels 12 (horizontal row) in the source 2D image and the corresponding first row of Dvs in the depth map are both arranged in the first row of the 2D-depth mixed image. In other words, any row of source pixels 12 in the horizontal direction and corresponding Dvs thereof in the source 2D image are arranged in positions of the same row of the 2D-depth mixed image; and in the vertical direction of the 2D-depth mixed image, it is arranged in a manner of repeating the content of a certain row in the 2D-depth mixed image, and it is repeated for n times. One example is set forth cited below for demonstration.

EXAMPLE 1 OF 2D-DEPTH MIXED IMAGE

It is assumed that a 3D stereoscopic image with nine views displayed in a 3D display 40 has a resolution of 1920×1080 pixels, and a source 2D image and a corresponding depth map both have a resolution of 640×360 pixels. Based upon the above principle, the resolution of the 2D-depth mixed image must be 1920×1080 pixels, and n may be determined according to the following equation (Equation 1), that is, n=3 (1920/640=3). In other words, the content of each row of the 2D-depth mixed image needs to be repeated for three times in the vertical direction.

$$n = V1/V2 \quad \text{(Equation 1)}$$

where V1 is a number that represents the total units of pixels corresponding to a resolution of a multi-views 3D stereoscopic image in a vertical direction; and V2 is a number that represents the total units of pixels corresponding to a resolution of a source 2D image in a vertical direction.

Figure 6:
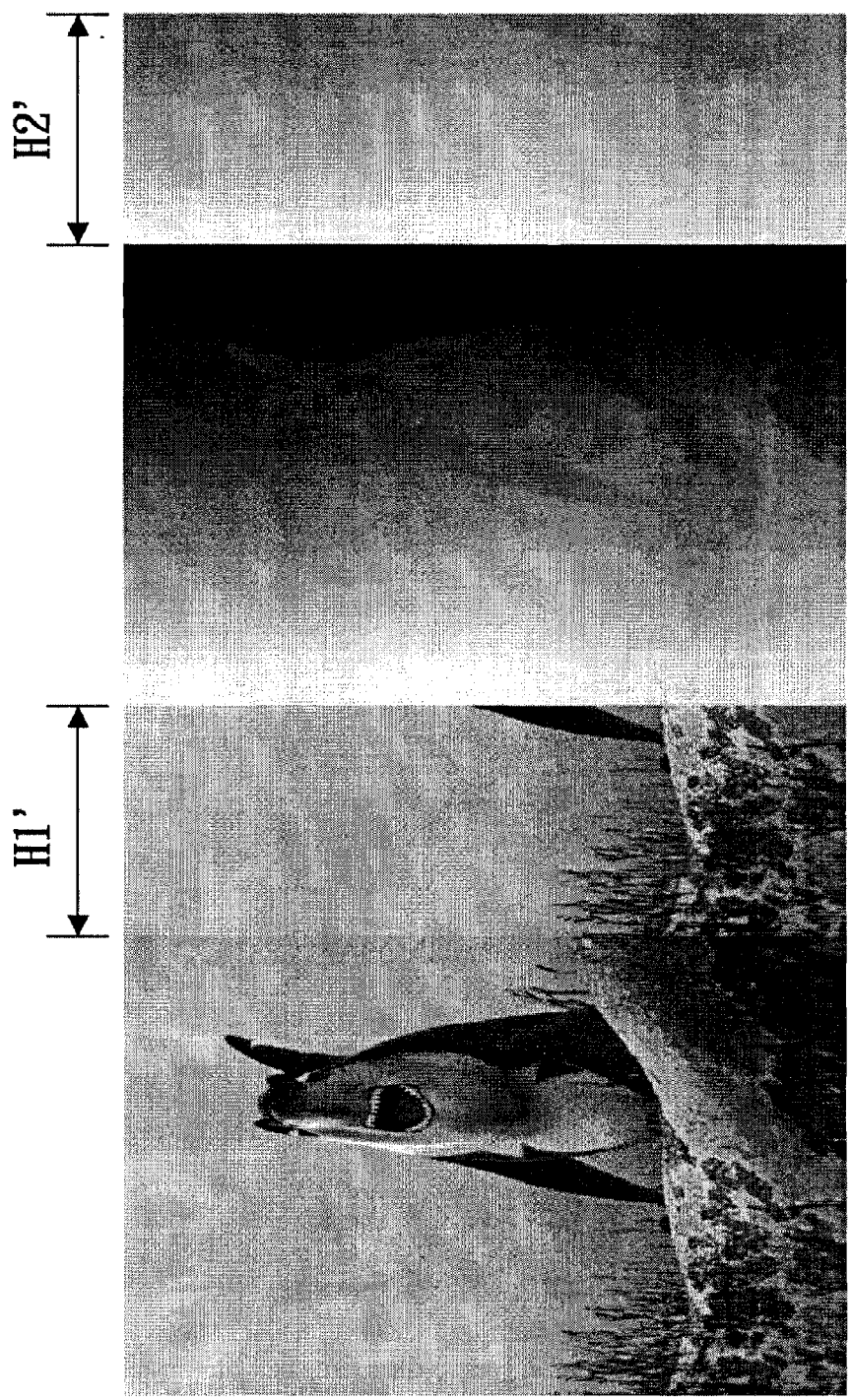
FIG. 6 shows an embodiment of a content of an example image in a 2D-depth mixed image according to the present disclosure.

In the above example, the 2D-depth mixed image has a resolution of 1080 pixels in the horizontal direction, so that the resolutions of both the left part and the right part of the 2D-depth mixed image should be 540 pixels (that is, one half of 1080 pixels). The resolutions of the source 2D image and the corresponding depth map in the horizontal direction are both 360 pixels, which are obviously insufficient. As for this problem, the source pixels 12 of the source 2D image are directly repeated in the insufficient portion on the left part, and the Dv values corresponding to the source pixels 12 are repeated in the right part. The 2D-depth mixed image shown in FIG. 6 is obtained according to the above arrangement manner. As seen from the left part of the 2D-depth mixed image in FIG. 6, the range marked by H1' repeats the content of a part of the front section of the source pixels 12, and the range marked by H2' repeats the content of the corresponding Dvs. Thus, the vertical direction of the 2D-depth mixed image is formed by repeating the content of each row for n times, and each row in the horizontal direction is formed by mixedly arranging the source pixels 12 on the left part and the corresponding Dvs on the right part in the same row.

Figure 4:
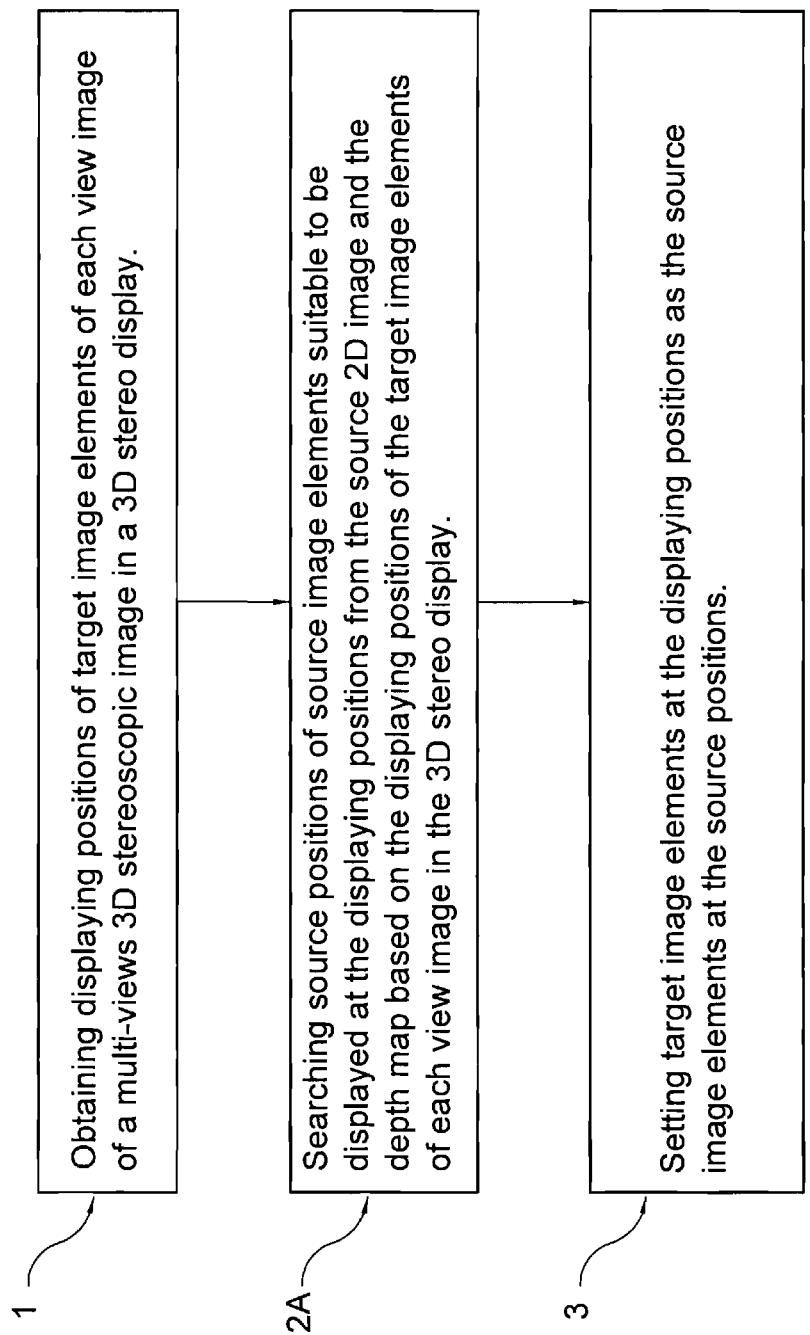
FIG. 4 shows steps in an embodiment of a method according to the present disclosure.

FIG. 4 and FIG. 5 show one embodiment of the arrangement manners of the 2D-depth mixed image. Other arrangements can also be utilized to practice the present disclosure. In another embodiment, positions of the source 2D image and the corresponding depth map are exchanged to form a 2D-depth mixed image with a left part being the depth map and a right part being the source pixels 12 of the source 2D image. Another embodiment relates to arranging source pixels and corresponding Dvs in the same row in an interlacing manner; in other words, the content in the same row of the 2D-depth mixed image is formed by mixing the source pixels 12 with the corresponding Dvs in the same row.

The multi-views 3D stereoscopic image is basically formed by a plurality of view images, and the pixels of such view images have fixed positions in the 3D display 40 (such as the example shown in FIG. 2). In order to facilitate the discrimination, in the embodiment of the present disclosure, the fixed positions are referred to as "displaying positions". Pixel information (comprising color and brightness of the pixel) of each displaying position is selected from a certain source pixel 12 in the source 2D image, and the specific displaying position where each source pixel 12 should be correspondingly disposed may be determined by a Dv corresponding to the source pixel 12. From another viewpoint, each source pixel 12 in the source 2D image has one corresponding Dv. Through "a depth-displacement conversion equation set forth below", each source pixel 12 is disposed according to which displaying position in the same row of which view image. Since different 3D displays 40 have different "depth-displacement conversion equations", the following "depth-displacement conversion equation (Equation 2)" is corresponding to one exemplary embodiment of the present disclosure as disclosed herein. Equation 2 may take further forms as well.

Through the following depth-displacement conversion equation (Equation 2), a relative displacement (referring to a displacement with respect to a current position thereof in the source image) of the source pixel 12 in a certain view image can be calculated. By adding the current position (x,y) of the source pixel 12 in the source 2D image with a relative displacement d thereof calculated through a "depth-displacement conversion equation" (for example, Equation 2), a specific displaying position in the certain view image where the source pixel 12 shall be disposed can be obtained. Since the source pixel 12 merely makes displacement in the horizontal direction among the positions in the same row, the displaying position thereof may be represented as (x+d,y), in which x represents a horizontal position in the row, and y represents the row number.

$$\text{Displacement} = [(z * VS\_EYE\_INTERVAL * VS\_V/0.5)/(VS\_VIEW\_DISTANCE + z)] * (VS\_PIXEL\_SIZE/VS\_SCREEN\_SIZE) \quad \text{(Equation 2)}$$

In Equation 2, the meaning of each parameter is given as follows.

$z = \text{DispBitmap} * (VS\_Z\_NEAR - VS\_Z\_FAR)/255.0 + VS\_Z\_FAR$, which represents a distance between a certain view image and a screen of the 3D display 40. The 255 indicates that this example adopts a division depth of 8 bits, but the present disclosure is not limited here, and other division depth may be selected according to practical requirements. If a division depth of 10 bits is used, 255 is replaced by 1023; and similarly, if a division depth of n bits is used, 255 is replaced by $2^n - 1$.

| DispBitmap | Depth |
|---|---|
| VS_SCREEN_SIZE | Screen width, Unit: cm |
| VS_PIXEL_SIZE | Screen resolution, Unit: pixel |
| VS_EYE_INTERVAL | Eye interval, Unit: cm |
| VS_VIEW_DISTANCE | Distance between the eye and the screen, Unit: cm |

-continued

| DispBitmap | Depth |
|---|---|
| VS_Z_NEAR | Minimum distance of the stereoscopic image being actually away from the screen, Unit: cm (Negative number represents a position before screen) |
| VS_Z_FAR | Maximum distance of the stereoscopic image being actually away from the screen, Unit: cm (Positive value represents a position before the screen) |
| VS_V (VS_V)$^{th}$ | view image |

Figure 7:
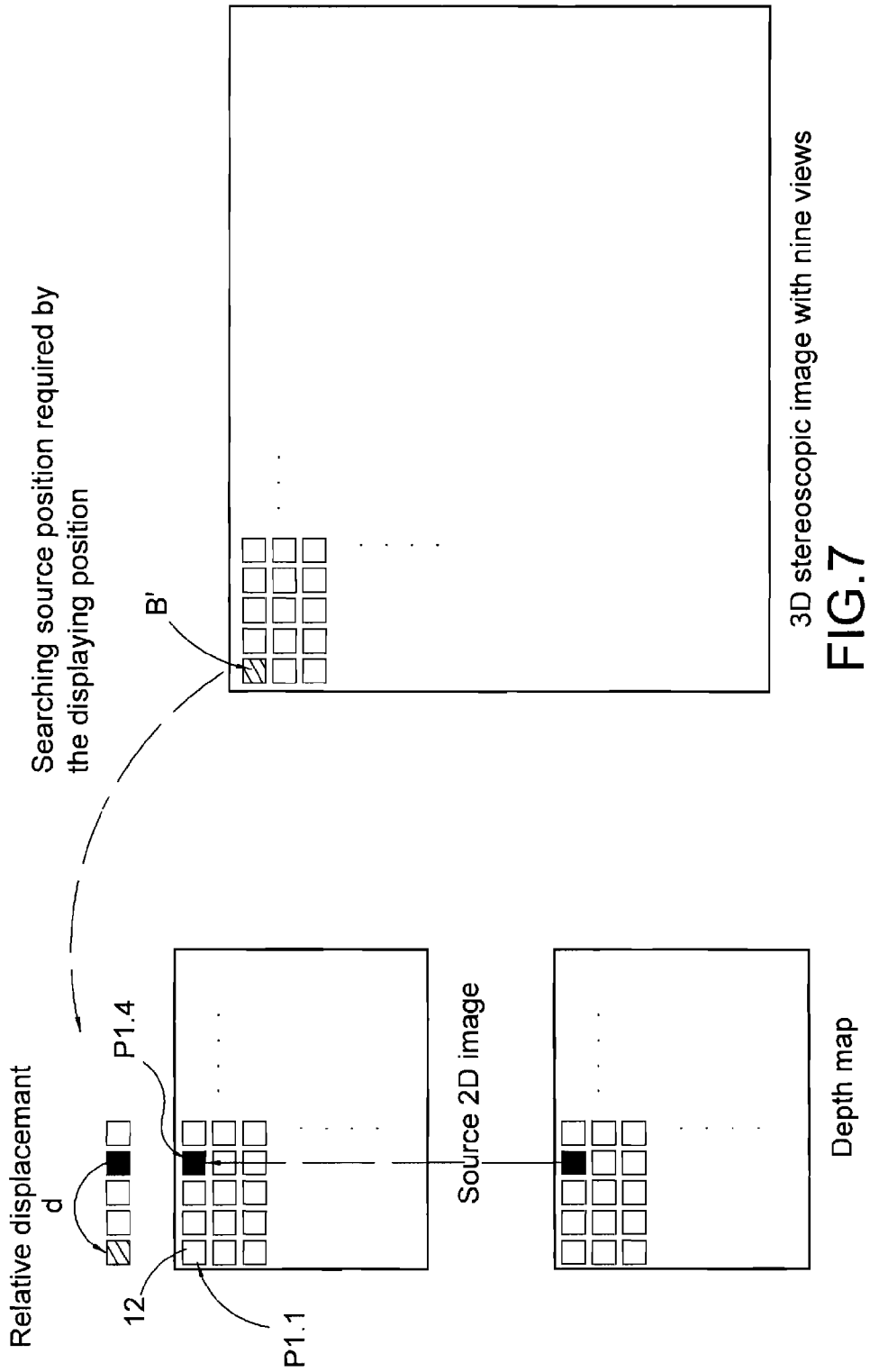
FIG. 7 shows an embodiment of the present disclosure, in which a relation between a displaying position of a pixel of a certain view image of a multi-views 3D stereoscopic image and a 2D-depth mixed image is shown.

The example of FIG. 7 shows a relation between displaying positions of pixels of a certain view image of a multi-views 3D stereoscopic image and a 2D-depth mixed image. In one embodiment of the present disclosure, based on displaying positions of pixels of each view image of a multi-views 3D stereoscopic image in a 3D display, source pixels 12 suitable to be displayed at each displaying position are obtained from a 2D-depth mixed image in an inverse view image searching manner by using information recorded in the 2D-depth mixed image, thereby generating a multi-views 3D stereoscopic image for being displayed in the 3D display.

As shown in FIG. 7, for example, in the 3D stereoscopic image with nine views, B' represents a displaying position of a first pixel of a first view image. In the embodiment of the detailed implementation of Step 3 in the method as shown in FIG. 4 according to the present disclosure, the relative displacement d of each source pixel 12 in the same row is searched according to the "depth-displacement conversion equation" sequentially beginning from a source pixel position P1.1 of the first source pixel 12 in the same row (first row) of the left part in the 2D-depth mixed diagram, and then a specific displaying position of the corresponding view image where the source pixel 12 shall be disposed is further calculated till a certain source pixel 12 (for example, P1.4 in the drawing) with the disposed displaying position being consistent with the current displaying position B' is obtained, so that the pixel at the displaying position B' is set as the obtained source pixel 12 (P1.4 in the drawing), in other words, the pixel information (comprising the color and the brightness of the pixel) of the pixel (comprising three sub-pixels) at the displaying position B' is the same as the pixel information of the source pixel 12 (P1.4 in the drawing). Accordingly, the source pixel 12 required by each displaying position in the 3D display 40 is calculated through the inverse view image searching manner, thereby generating a multi-views 3D stereoscopic image.

Figure 8:
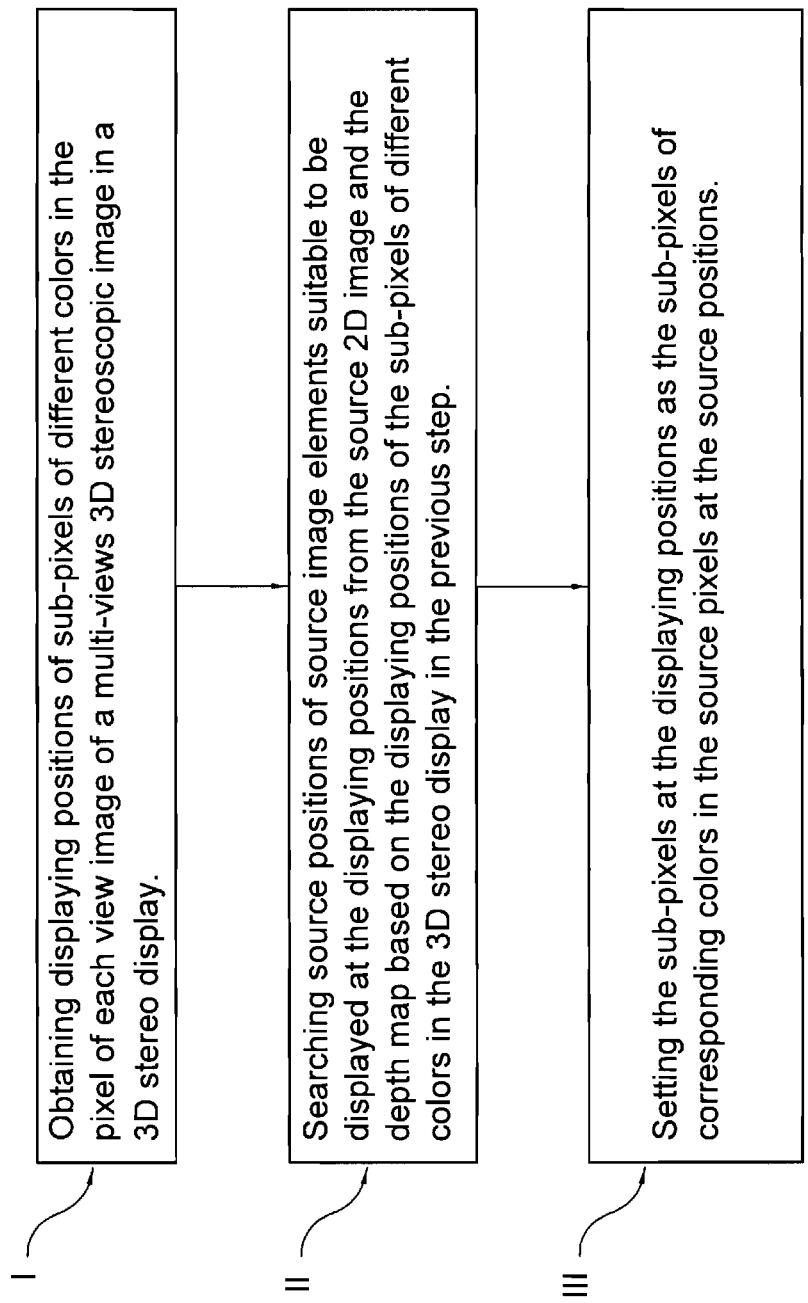
FIG. 8 shows steps of another embodiment of the present disclosure, in which sub-pixels serve as processing units.

In another embodiment of the method according to the present disclosure, sub-pixels serve as the target image element and the source image element in the method as shown in FIG. 4, so as to generate a multi-views 3D stereoscopic image for being displayed in a 3D display 40 by using a source 2D image and a corresponding depth map. Referring to FIG. 8, the method includes the following steps:

I. Obtaining displaying positions of sub-pixels of different colors in the pixel of each view image of a multi-views 3D stereoscopic image in a 3D stereo display 40;

II. Searching source positions of source image elements to be displayed at the displaying positions from the source 2D image and the depth map based on the displaying positions of the sub-pixels of different colors in the 3D stereo display 40 in the previous step; and III. Setting the sub-pixels at the displaying positions as the sub-pixels of corresponding colors in the source pixels at the source positions, thereby generating a multi-views 3D stereoscopic image.

Figure 9:
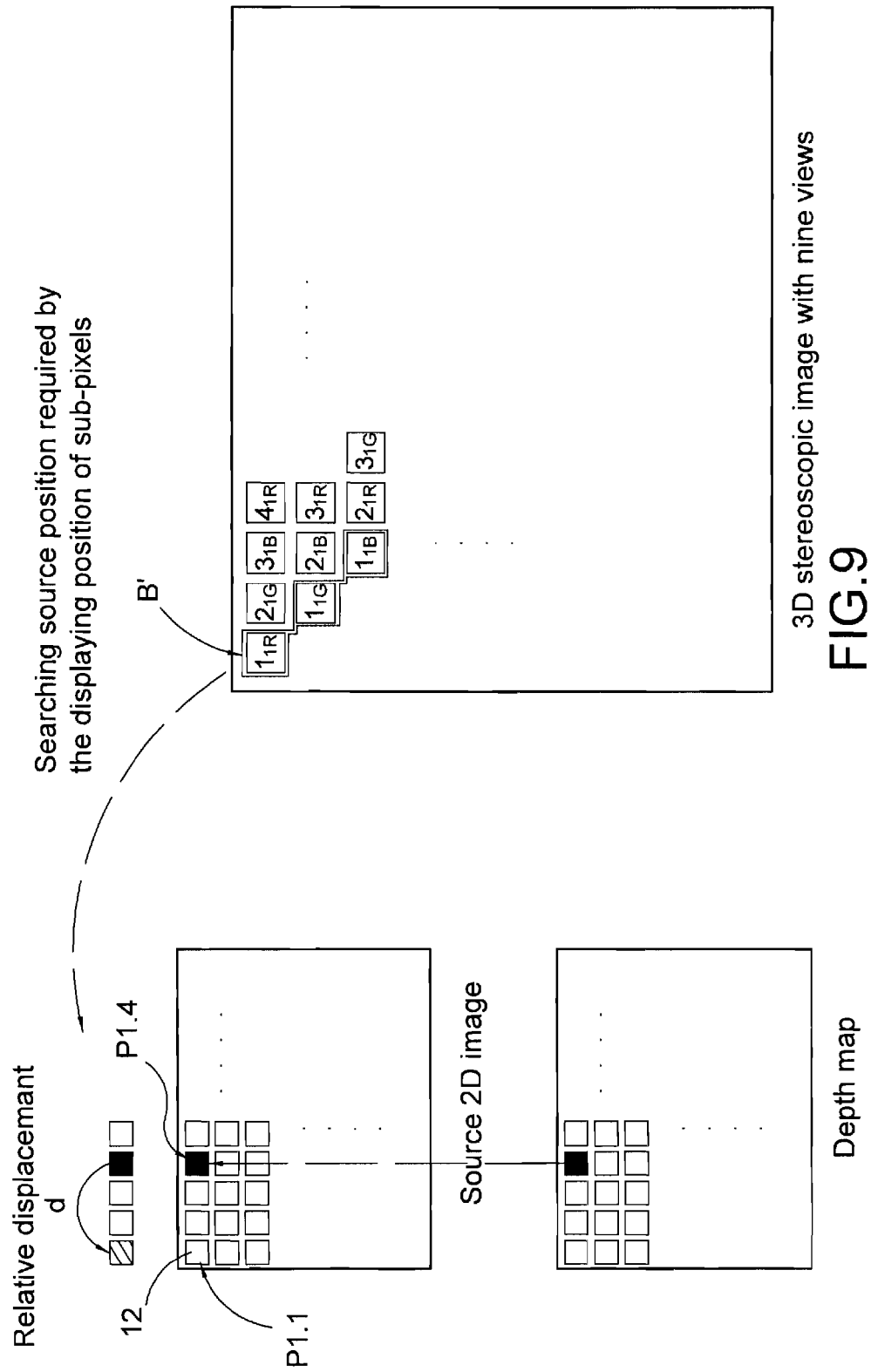
FIG. 9 is an exemplary view of the method of FIG. 8, showing how to search a red sub-pixel of a first pixel in a first view image from a 2D-depth mixed image.

FIG. 9 shows a schematic view of a method embodiment of FIG. 8. Assume that in the method of FIG. 8, search is preformed from the red sub-pixel $1_{1R}$ of the first pixel of the first view image, and a displaying position of the first pixel of the first view image is B'. The relative displacement d of each source pixel 12 in the same row is searched according to the "depth-displacement conversion equation" sequentially beginning from a source pixel position P1.1 of the first source pixel 12 in the same row (first row) of the left part in the 2D-depth mixed image, and then a specific displaying position of the corresponding view image where the source pixel 12 shall be disposed is further calculated till a certain source pixel 12 (for example, P1.4 in the FIG. 9) with the disposed displaying position being consistent with the current displaying position B' is obtained. Then, the red sub-pixel $1_{1R}$ of the pixel at the display position B' is set as the red sub-pixel of the source pixel 12 (P1.4 in FIG. 9). Accordingly, the source pixel 12 required by the sub-pixel at each displaying position in the 3D display 40 and the sub-pixels thereof are calculated through the inverse view image searching manner, thereby generating a multi-views 3D stereoscopic image.

Figure 10:
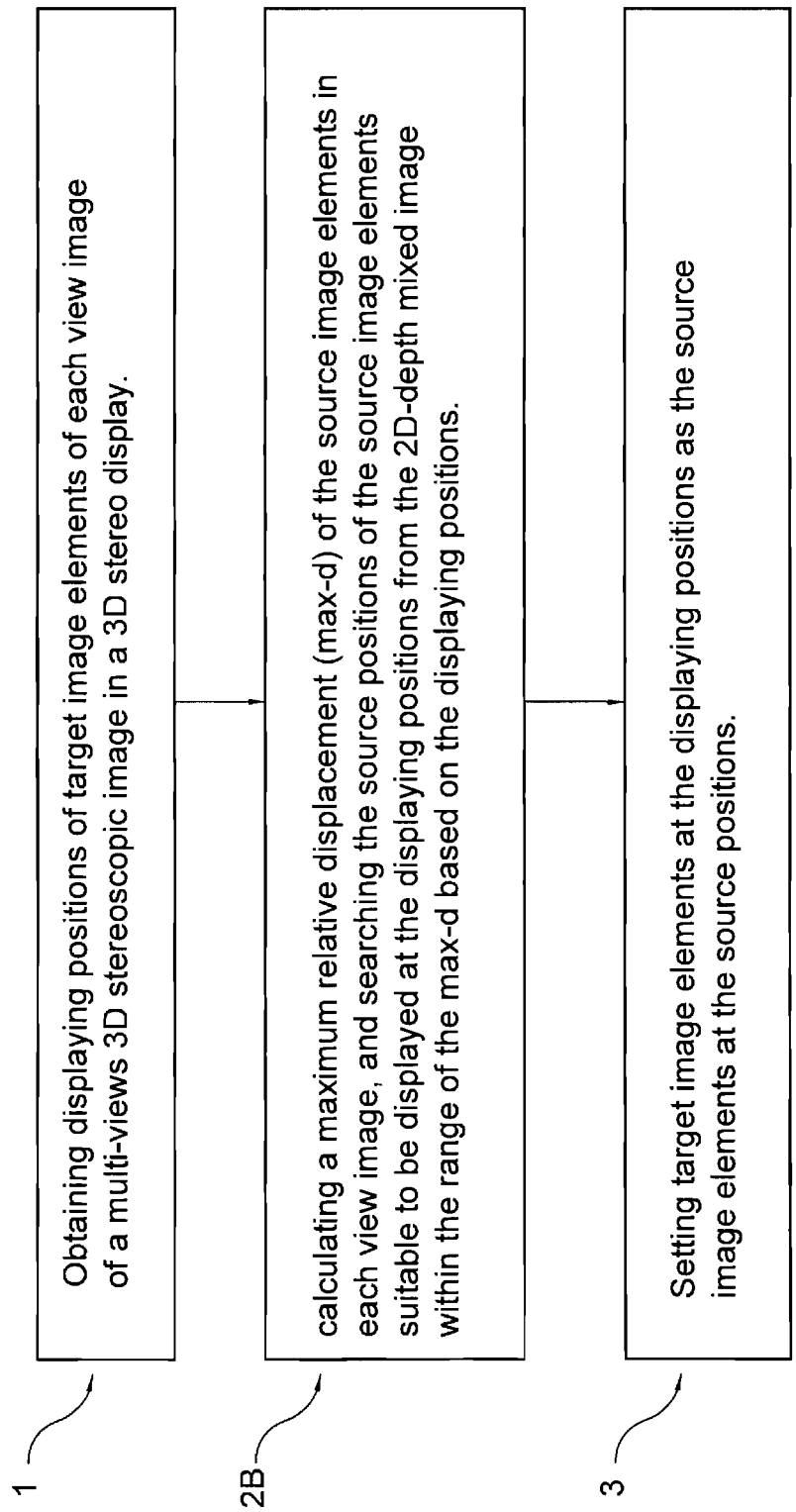
FIG. 10 shows steps of another embodiment of the method according to the present disclosure.

In another embodiment of the method according to the present disclosure (as shown in FIG. 10), Step 2B further comprises calculating a maximum relative displacement (max-d) of the source image element in each view image, and then source positions of the source image elements suitable to be displayed at the displaying positions are searched from the 2D-depth mixed image within the range of the max-d based on the displaying positions of target image elements of each view image in the 3D display 40.

Figure 11:
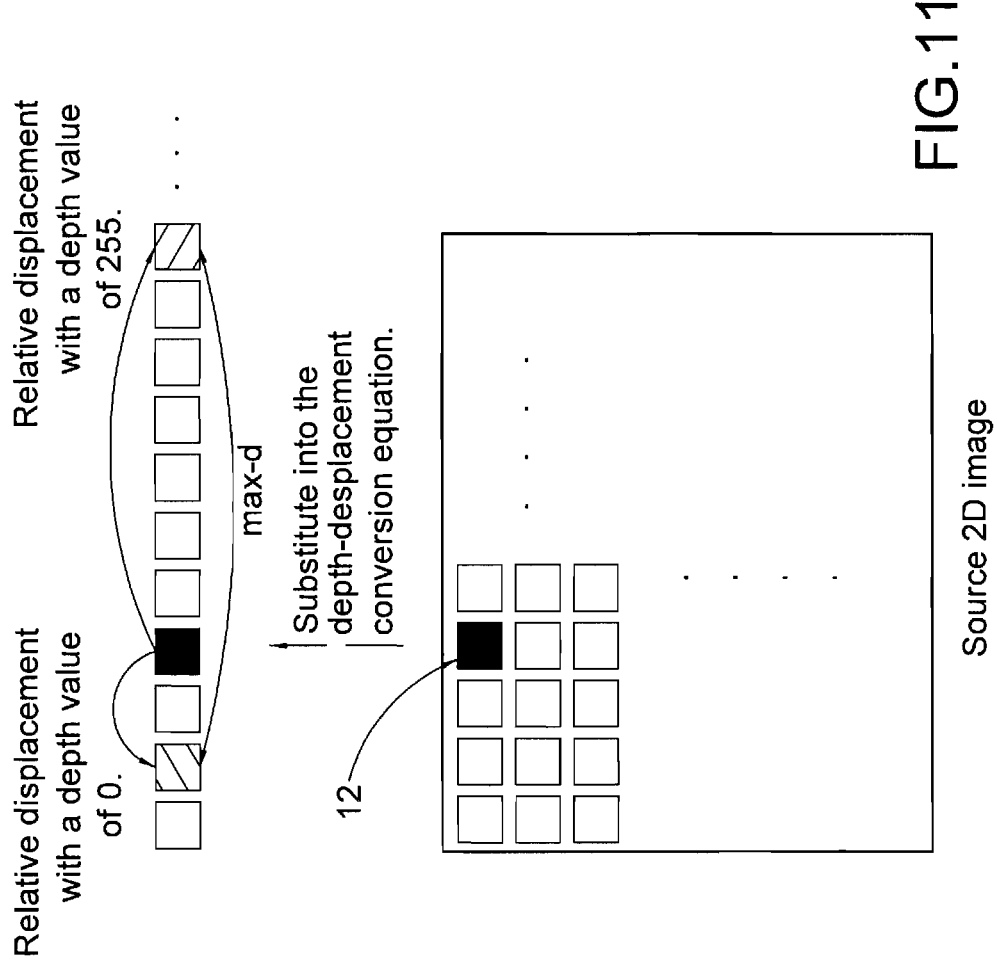
FIG. 11 shows an embodiment for calculating a range of a maximum relative displacement in the method according to the present disclosure.

The relative displacement d of the source image element (for example, the source pixel 12) in each view image is associated with a corresponding Dv of the source pixel 12. The larger the relative displacement d is, the longer the distance between the displaying position of each view image where the source pixel 12 is disposed and the position of the source pixel 12 in the source 2D image will be, and as a result, the searching time in Step 3 is prolonged. Thus, a maximum Dv (for example, 255) and a minimum Dv (for example, 0) are substituted into the "depth-displacement conversion equation", so as to calculate the max-d of the source pixel 12 in each view image before hand. In the example shown in FIG. 11, as for the $x^{th}$ source pixel 12 in a certain row, a maximum Dv (for example 255) and a minimum Dv (for example, 0) are respectively substituted into the "depth-displacement conversion equation", so as to calculate a range of the max-d of the $x^{th}$ source pixel 12 in a first view image, such that when subsequently searching the source position of the target image element suitable to be displayed in the first view image at the displaying position in the 3D display 40, the source position of the source image element suitable to be displayed at the displaying position is searched from the 2D-depth mixed image within the range of the max-d, which is helpful for saving the searching time.

Figure 12:
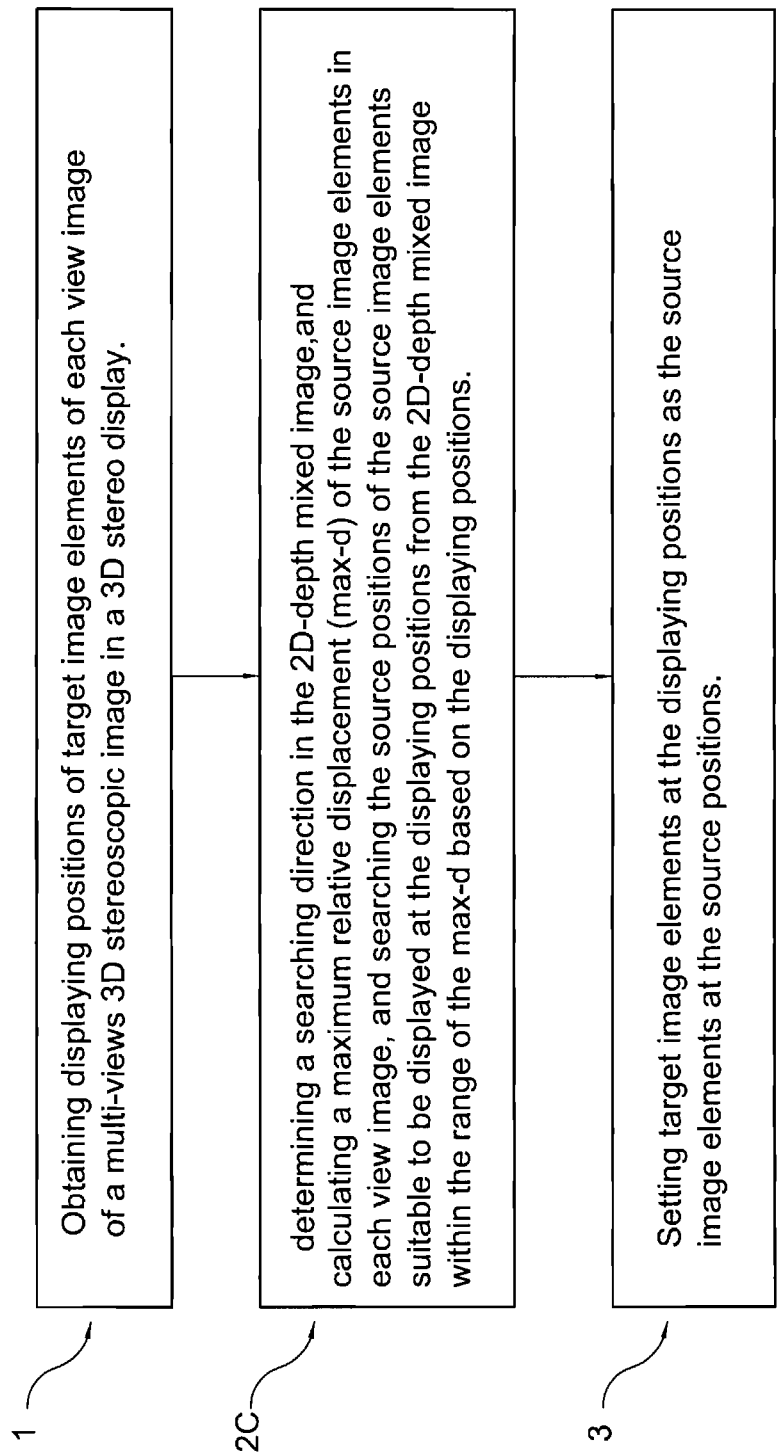
FIG. 12 shows steps of another embodiment of the method according to the present disclosure.
Figure 13:
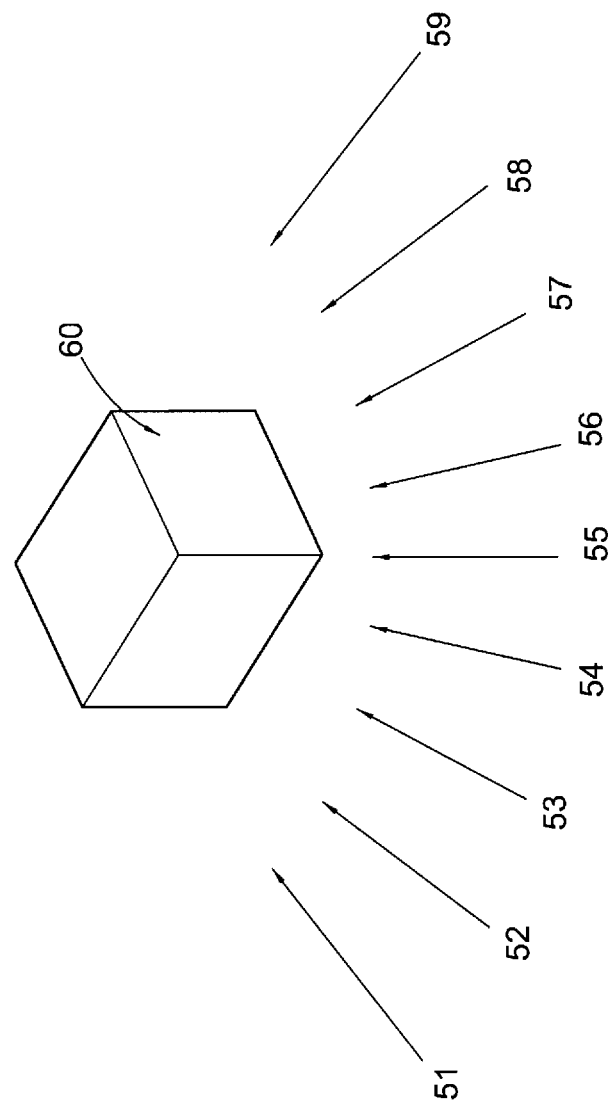
FIG. 13 shows relations between a position of an object and positions of observation points for the first to ninth view images according to an embodiment of the present disclosure.

In another embodiment of the method according to the present disclosure (as shown in FIG. 12), Step 2C further comprises determining a searching direction in the 2D-depth mixed image based on an arrangement sequence of a current view image to be searched, and then source positions of the source image elements suitable to be displayed at the displaying positions are searched from the 2D-depth mixed image within the range of the max-d based on the displaying positions of target image elements of each view image in the 3D display 40. The multi-views 3D stereoscopic image comprises two or more view images, which are divided into views in the left region and that in the right region. Taking a 3D stereoscopic image with nine views as an example, a relation between a position of an object 60 in each view image and positions of observation points in the first to ninth view images 51-59 is as shown in FIG. 13. It is assumed that the fifth view is a front view, and the first to fourth views 51-54 and the sixth to ninth views 56-59 are respectively views in the left region and the right region. When searching the source image element in the left region, each source image element is sequentially searched from left to right within the range of max-d; on the contrary, when searching the source image element in the right region, it is sequentially searched from right to left. If the same information is found, the searching manner can avoid selecting incorrect source image elements.

Figure 14:
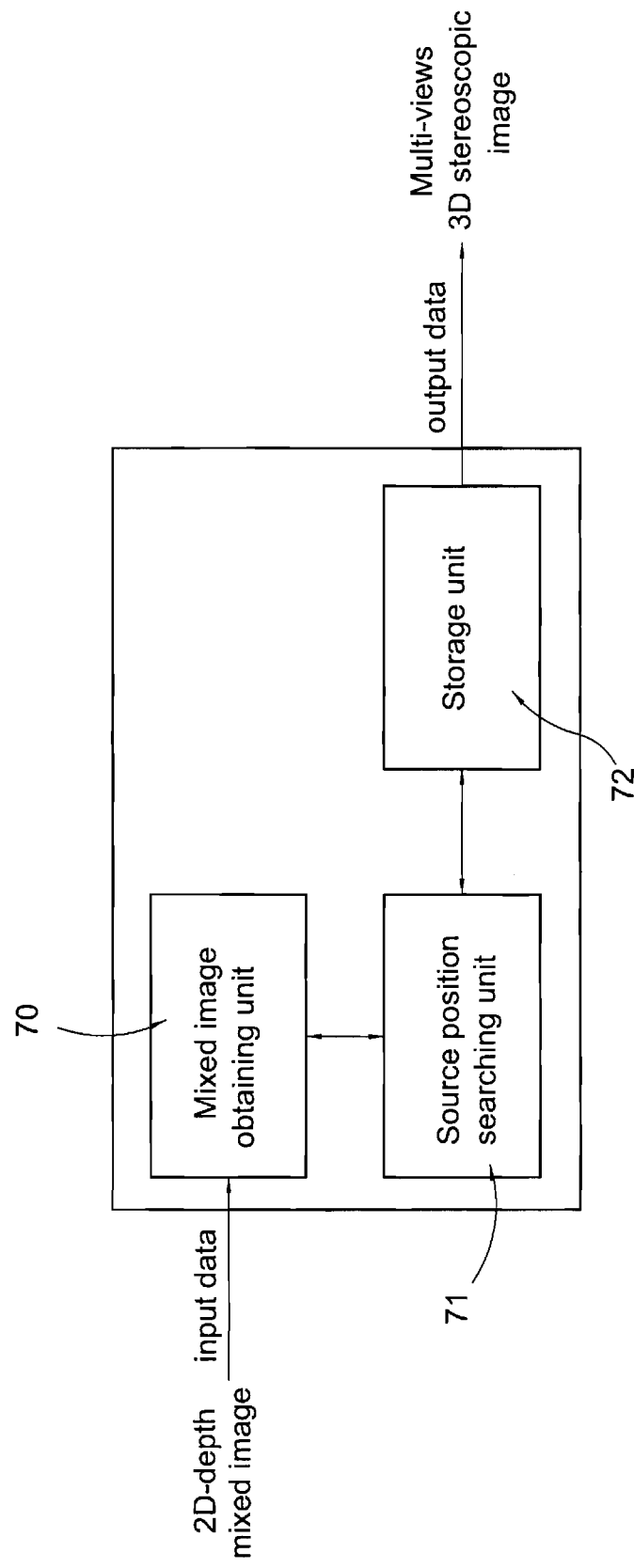
FIG. 14 shows an embodiment of a device according to the present disclosure.

As shown in FIG. 14, in an embodiment, the present disclosure provides a device applicable to generate a multi-views 3D stereoscopic image for being displayed in a 3D stereo display 40, which comprises a mixed image obtaining unit 70, a source position searching unit 71, and a storage unit 72.

The mixed image obtaining unit 70 is used for obtaining a 2D-depth mixed image from a source 2D image and a corresponding depth map.

The source position searching unit 71 is used for searching source positions of source image elements suitable to be displayed at the displaying positions from the 2D-depth mixed image based on the displaying positions of target image elements of each view image in a 3D display 40, and setting the target image elements at the displaying positions as the source image elements at the source positions.

The storage unit 72 is used for storing information of target image elements in each view image of the multi-views 3D stereoscopic image and used for generating a multi-views 3D stereoscopic image for being displayed in the 3D stereo display 40.

One of the embodiments of above device may be implemented in a form of firmware, and particularly, each unit 70-72 in the above device may be implemented by an integrated circuit (IC) or chip having a data processing capability. It is better that the IC or the chip has a memory built therein. A CPU in the IC or chip is used to execute the mixed image obtaining unit 70 and the source position searching unit 71, and the 2D-depth mixed image is taken as input data of the device, and the multi-views 3D stereoscopic image is taken as output data for being displayed on the screen of the 3D display 40.

Figure 15:
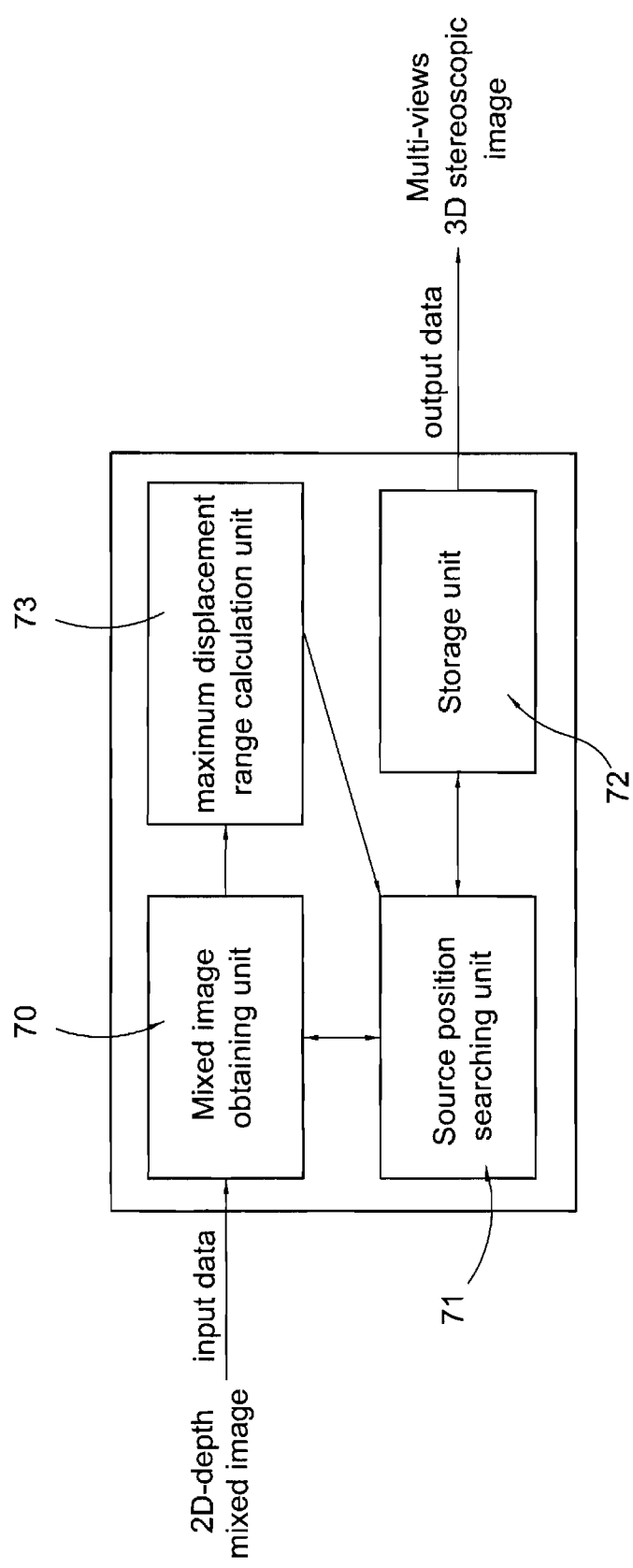
FIG. 15 shows another embodiment of the device according to the present disclosure.

FIG. 15 shows another embodiment of the device according to the present disclosure, in which a maximum displacement range calculation unit 73 is further included. Thus, based on the displaying positions of target image elements of each view image in the 3D display 40, the source position searching unit 71 searches the source positions of the source image elements suitable to be displayed at the displaying positions from the 2D-depth mixed image within the range of the max-d, and thus the time for searching is saved.

To sum up, the method and the device for generating a multi-views 3D stereoscopic image according to the present disclosure can reduce the occupied memory capacity and accelerate the speed for generating the multi-views 3D stereoscopic image. As compared with the prior art, the memory capacity required in the method of the present disclosure is shown in the following Table 1, which indeed saves a lot of memory capacity, and further reduces the element area when the device of the present disclosure is realized by the ICs or chips.

TABLE 1

|  | 2D image | Depth map | 9-view image | Multi-view stereoscopic of 3D image |
|---|---|---|---|---|
| Prior use Memory | 5.5 Mbits | 5.5 Mbits | 50 Mbits | 50 Mbits |
| Present disclosure use Memory | 0.015 Mbits | 0.015 Mbits | — | 0.138 Mbits |
| Reduce % | 99.7% | 99.7% | 100% | 99.7% |

What is claimed is:

1. A method for generating multi-views three-dimensional (3D) stereoscopic image, wherein a multi-views 3D stereoscopic image for being displayed in a 3D stereo display is formed by using a source two-dimensional (2D) image and a corresponding depth map having a depth values, the method comprising:
   obtaining displaying positions of target image elements of each view image of the multi-views 3D stereoscopic image in the 3D stereo display;
   searching source positions of source image elements from the source 2D image and the depth map based on the displaying positions; and
   setting the target image elements at the displaying positions as the source image elements at the source positions, wherein started from positions of the first source image elements in the source 2D image and the corresponding depth map, relative displacements of the source image elements in the same row of the displaying positions are searched through a depth-displacement conversion equation, it is further calculated to which displaying position of the corresponding view image the source image element is going to be disposed, and until finding that a displaying position of a certain source image element is consistent with the displaying position, the target image element at the displaying position is set as the found source image element at the source position.

2. The method for generating multi-views 3D stereoscopic image according to claim 1, wherein the target image element and the source image element are pixels or sub-pixels of a pixel.

3. The method for generating multi-views 3D stereoscopic image according to claim 1, further comprising combining the source 2D image and the corresponding depth map into a 2D-depth mixed image.

4. The method for generating multi-views 3D stereoscopic image according to claim 3, wherein the 2D-depth mixed image has a resolution the same as a resolution of the multi-views 3D stereoscopic image.

5. The method for generating multi-views 3D stereoscopic image according to claim 3, wherein the source 2D image and the corresponding depth map are respectively arranged on a left half part and a right half part of the 2D-depth mixed image.

6. The method for generating multi-views 3D stereoscopic image according to claim 3, wherein any row of the source image elements in a horizontal direction and their corresponding depth values of the depth map in the source 2D image are arranged in positions of the same row of the 2D-depth mixed image; in a vertical direction of the 2D-depth mixed image, it is arranged in a manner of repeating content of a certain row in the 2D-depth mixed image for n times, and n=V1N2, wherein the V1 is a resolution of the multi-views 3D stereoscopic image in the vertical direction, and the V2 is a resolution of the source 2D image in the vertical direction.

7. The method for generating multi-views 3D stereoscopic image according to claim 3, wherein the content in the same row of the 2D-depth mixed image is formed by mixing the source image elements in the same row and corresponding depth values thereof in an interlacing manner.

8. A device for generating multi-views three-dimensional (3D) stereoscopic image, wherein a multi-views 3D stereoscopic image for being displayed by a 3D stereo display is formed by using a source two-dimensional (2D) image and a corresponding depth map having a depth values, the device comprising:
   a source position searching unit, for searching source positions of source image elements suitable to be displayed at displaying positions from the source 2D image and the corresponding depth map based on the displaying positions of target image elements of each view image in the 3D stereo display, and setting the target image elements at the displaying positions as the source image elements at the source positions, wherein the source position searching unit starts from positions of the first source image elements in the source 2D image and the corresponding depth map, relative displacements of the source image elements in the same row of the displaying positions are searched through a depth-displacement conversion equation, it is further calculated to which displaying position of the corresponding view image the source image element is going to be disposed, and until finding that a displaying position of a certain source image element is consistent with the displaying position, the target image element at the displaying position is set as the found source image element at the source position; and
   a storage unit, for storing information of the target image elements each of the view images in the multi-views 3D stereoscopic image, so as to generate the multi-views 3D stereoscopic image for being displayed in the 3D stereo display.

9. The device for generating multi-views 3D stereoscopic image according to claim 8 device for generating multi-views 3D stereoscopic image, wherein the target image element and the source image element are pixels or sub-pixels of a pixel.

10. The device for generating multi-views 3D stereoscopic image according to claim 8 device for generating multi-views 3D stereoscopic image, wherein the source position searching unit and the storage unit are integrated circuits (ICs) or chips having data processing capabilities.

11. The device for generating multi-views 3D stereoscopic image according to claim 8, further comprising a mixed image obtaining unit, for obtaining a 2D-depth mixed image formed by combining the source 2D image and the corresponding depth map.

12. The device for generating multi-views 3D stereoscopic image according to claim 11, wherein the 2D-depth mixed image has a resolution the same as a resolution of the multi-views 3D stereoscopic image.

13. The device for generating multi-views 3D stereoscopic image according to claim 11, wherein the source 2D image and the corresponding depth map are respectively arranged at a left half part and a right half part of the 2D-depth mixed image.

14. The device for generating multi-views 3D stereoscopic image according to claim 11, wherein any row of the source image elements in a horizontal direction and their corresponding depth values of the depth map in the source 2D image are arranged in positions of the same row of the 2D-depth mixed image; in a vertical direction of the 2D-depth mixed image, it is arranged in a manner of repeating content of a certain row in the 2D-depth mixed image for n times, and n=V1N2, wherein the V1 is a resolution of the multi-views 3D stereoscopic image in the vertical direction, and the V2 is a resolution of the source 2D image in the vertical direction.

15. The device for generating multi-views 3D stereoscopic image according to claim 11, wherein the content in the same row of the 2D-depth mixed image is formed by mixing the source image elements in the same row and corresponding depth values thereof in an interlacing manner.

16. A device for generating multi-views three-dimensional (3D) stereoscopic image, wherein a multi-views 3D stereoscopic image for being displayed by a 3D stereo display is formed by using a source two-dimensional (2D) image and a corresponding depth map having a depth values, the device comprising:
   a source position searching unit, for searching source positions of source image elements suitable to be displayed at displaying positions from the source 2D image and the corresponding depth map based on the displaying positions of target image elements of each view image in the 3D stereo display, and setting the target image elements at the displaying positions as the source image elements at the source positions;
   a storage unit, for storing information of the target image elements each of the view images in the multi-views 3D stereoscopic image, so as to generate the multi-views 3D stereoscopic image for being displayed in the 3D stereo display; and
   a mixed image obtaining unit, for obtaining a 2D-depth mixed image formed by combining the source 2D image and the corresponding depth map,
   wherein any row of the source image elements in a horizontal direction and their corresponding depth values of the depth map in the source 2D image are arranged in positions of the same row of the 2D-depth mixed image; in a vertical direction of the 2D-depth mixed image, it is arranged in a manner of repeating content of a certain row in the 2D-depth mixed image for n times, and n=V1N2, wherein the V1 is a resolution of the multi-views 3D stereoscopic image in the vertical direction, and the V2 is a resolution of the source 2D image in the vertical direction.

* * * * *